United States Patent [19]
Toth

[11] Patent Number: 5,665,256
[45] Date of Patent: Sep. 9, 1997

[54] CUTTING OR WELDING SYSTEM HAVING PHASE LOSS DETECTOR AND METHOD OF DETECTING PHASE LOSS FOR SAME

[75] Inventor: Tibor E. Toth, Florence, S.C.

[73] Assignee: The ESAB Group, Inc., Florence, S.C.

[21] Appl. No.: 574,973

[22] Filed: Dec. 19, 1995

[51] Int. Cl.[6] ................................................. B23K 9/095
[52] U.S. Cl. ......................... 219/130.21; 219/137 PS
[58] Field of Search .......................... 219/130.21, 130.1, 219/130.31, 130.32, 130.33, 137 PS, 137.71; 307/127; 361/89, 90, 91, 92

[56] References Cited

U.S. PATENT DOCUMENTS

| | | | |
|---|---|---|---|
| 3,243,796 | 3/1966 | Harmon et al. | 361/89 |
| 3,636,541 | 1/1972 | Genuit et al. | 361/89 |
| 3,716,718 | 2/1973 | Nowell | 361/89 |
| 3,843,908 | 10/1974 | Priegnitz | 361/89 |
| 3,849,627 | 11/1974 | Blavier | 219/137.71 |
| 3,896,287 | 7/1975 | Cook | 219/130.33 |
| 4,024,438 | 5/1977 | Priegnitz | 361/92 |
| 4,034,269 | 7/1977 | Wilkinson | 361/89 |
| 4,346,307 | 8/1982 | Zulaski | 361/90 |

OTHER PUBLICATIONS

ESAB Welding & Cutting Products, *Instruction Manual, VI 450 Welding Power Source*, F–15–098–A, Mar. 1995.
L–TEC Welding & Cutting Systems, *Instructions for L–TEC 450 Welding Power Supply*, P/N 678530, F–12–961–B, Oct. 1990.

Primary Examiner—Clifford C. Shaw
Attorney, Agent, or Firm—Bell, Seltzer, Park & Gibson

[57] ABSTRACT

An apparatus and method for detecting phase loss in a cutting or welding system is provided. The apparatus preferably includes a cutting or welding torch and a power source operatively connected to the torch. The power source for a cutting or welding system preferably has a power circuit which includes an electrical input line positioned to receive power from an external power supply, a transformer having a primary side connected to the input line and a secondary side, a rectifier operatively connected to the secondary side of the transformer, and an output line connected to the rectifier. The power source also has a phase loss detector operatively connected to the secondary side of the transformer for detecting phase loss responsive to a ripple voltage exceeding a predetermined threshold. The method of detecting phase loss in a cutting or welding system preferably includes filtering an electrical signal representative of a voltage so that only a ripple voltage passes therethrough, detecting a change in the ripple voltage representative of a phase loss, and communicating the change in ripple voltage representative of a phase loss to an operator of the system.

28 Claims, 4 Drawing Sheets

CUTTING OR WELDING SYSTEM HAVING PHASE LOSS DETECTOR AND METHOD OF DETECTING PHASE LOSS FOR SAME

FIELD OF INVENTION

This invention relates to a cutting or welding apparatus and, more particularly, to an apparatus and method for detecting phase loss in a cutting or welding system.

BACKGROUND OF THE INVENTION

Various industrial and commercial cutting and welding systems (e.g., electric arc welders) are generally well known. These systems conventionally include a cutting or welding arc torch and a cutting or welding power source electrically connected to the torch for supplying electric power thereto. These cutting or welding systems, for example, include electroslag or stick electrode welders, Metal-Inert Gas ("MIG") welders, and Tungsten-Inert Gas ("TIG") welders and include manual and automated cutting or welding systems. For example, in a conventional automated cutting or welding system, one or more arc torches (e.g., cutting torch, welding torch, plasma arc torch) are often supported on a frame bridge and carriage system. A drive, i.e., motor, moves the arc torches along X-Y-Z coordinates during the cutting or welding of a workpiece positioned beneath the torch. A controller (e.g., preferably including a microprocessor), which usually includes a numerical control operating system, provides precise control over the position, movement, and acceleration of the torch to enable precision cutting or welding of the workpiece.

During initial setup for system operation, the system operator preferably presets the amount of cutting or welding current and the amount of gas and water flow into the torch. During system operation, for example, the power source generates a cutting or welding current to an electrode of the torch, a flow of gas is generated between the electrode and a nozzle assembly of the torch, and an electrical arc is generated extending from the electrode through a bore of a nozzle assembly of the torch into contact with a workpiece positioned beneath the nozzle assembly. The operator then manually adjusts the cutting or welding current to compensate for load changes which occur through process parameter changes such as changes in plate thickness, changes in plasma gas flow, changes in the distance from the plate to the torch, and changes in the gas and water flows into the torch.

Additionally, in such cutting or welding systems, the power source, for example, may conventionally include an input line which is connected to a conventional external supply of electric power, such as household or industrial alternating current. The power source also includes two terminals at the output side to assist in forming the cutting or welding arc. One of the terminals is connected to the welding or cutting torch, and the other terminal is connected to the workpiece to complete or close a circuit with the power source.

There is a need, however, to provide more data about the status of the various control signals such as the status of power phases (e.g., effective and inexpensive phase loss detection), more digital controls for various operations, and more simplified and less expensive controls of cutting or welding systems.

SUMMARY OF THE INVENTION

The above needs are met and other advantages are accomplished by the provision of a phase loss detector for a cutting or welding system according to the embodiments of the present invention. The phase loss detector advantageously provides an efficient and less expensive apparatus and method for detecting phase loss such as supplied to a three-phase cutting or welding power source.

More particularly, an apparatus for detecting phase loss in a cutting or welding system is provided that preferably has a cutting or welding torch and a cutting or welding power source operatively connected to the torch for supplying power to the torch. The cutting or welding power source according to the present invention preferably includes at least a power circuit having an electrical input line positioned to receive power from an external power supply, a transformer having a primary side connected to the input line and a secondary side, a rectifier connected to the secondary side of the transformer, and an output line connected to the rectifier. The power source also has means, e.g., a phase loss detector, operatively connected to the secondary side of the transformer for detecting phase loss responsive to a ripple voltage level exceeding a predetermined threshold level.

The present invention also provides methods of detecting a phase loss for a cutting or welding system. A method of detecting phase loss in a cutting or welding system preferably includes filtering an electrical signal representative of a voltage so that only a ripple voltage passes therethrough, detecting a change in the ripple voltage representative of a phase loss, and communicating the change in ripple voltage representative of a phase loss to an operator of the system. A method according to the invention may also includes filtering an electrical signal representative of a voltage so that only a ripple voltage passes therethrough, blocking the ripple voltage below a predetermined threshold, and disabling the power source responsive to the ripple voltage exceeding a predetermined threshold.

BRIEF DESCRIPTION OF THE DRAWINGS

Some of the features and advantages of the present invention having been stated, others will become apparent as the description proceeds when taken in conjunction with the accompanying drawings, in which.

DETAILED DESCRIPTION

The present invention now will be described more fully hereinafter with reference to the accompanying drawings in which illustrated embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

Figure 1:
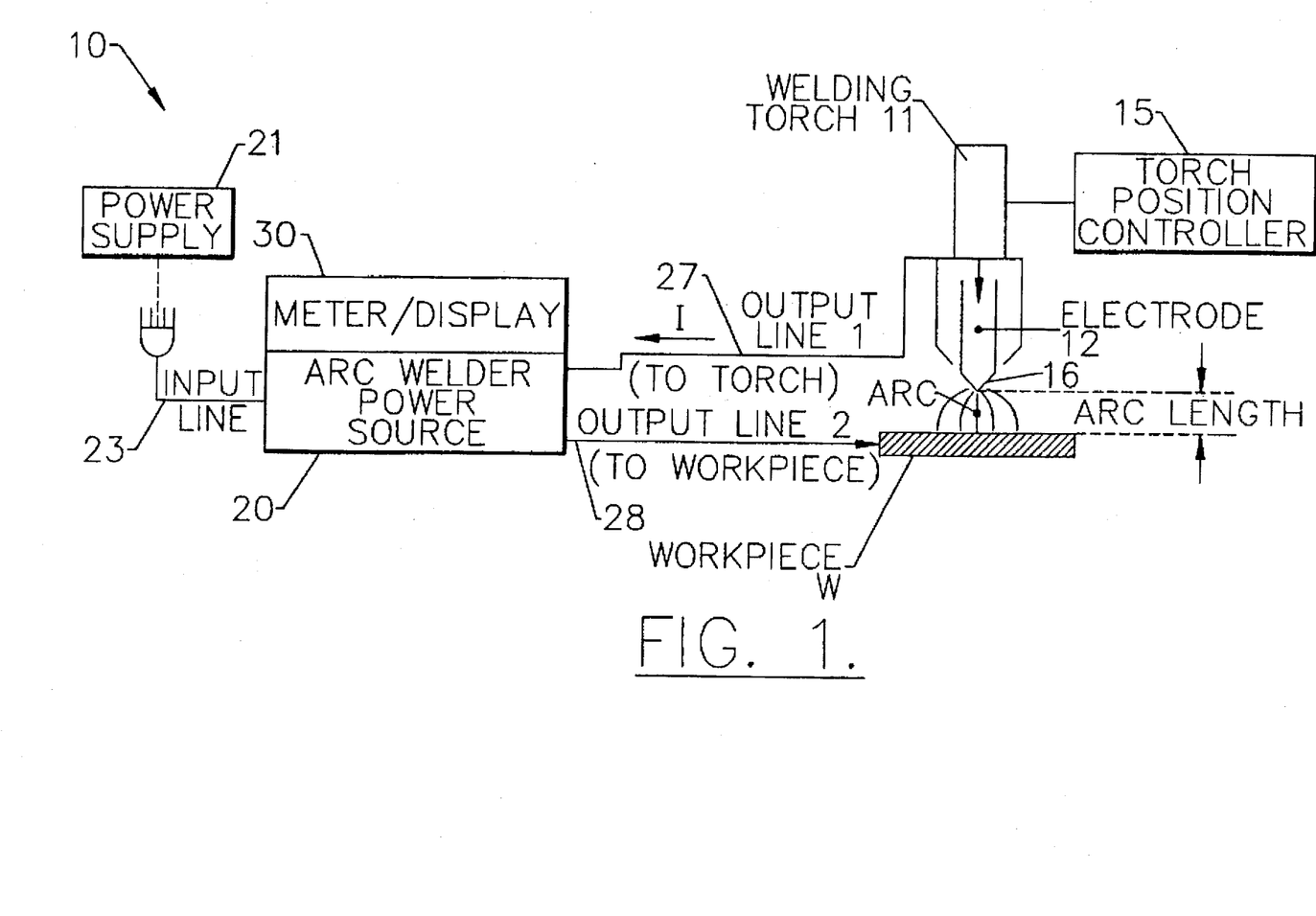
FIG. 1 illustrates a schematic view of a cutting or welding system which includes a power source of a cutting or welding system according to an embodiment of the present invention.

FIG. 1 schematically illustrates a cutting or welding system 10 according to an embodiment of the present invention. As understood by those skilled in the art, the cutting or welding system 10 preferably has at least a cutting or welding torch (e.g., an arc torch) 11 preferably including at least an electrode 12 having an arc discharge end 16. The torch 11 may also include means (e.g., switch or plasma gas flow) for creating an electrical arc extending from the electrode to a workpiece W, e.g., arc length $L_{Arc}$, and a cutting or welding power source 20 operatively connected to the electrode 12 of the arc torch 11 for supplying power to the arc torch 11. An arc torch position controller 15 as also understood by those skilled in the art may also be operatively connected to the torch 11 for controlling the position of the torch 11 for cutting or welding operations in a relatively automated manner. The torch position controller 15 provides precise control over the position, movement, and acceleration of the torch to enable precision cutting or welding of a workpiece W. It will also be understood by those skilled in the art, however, that the manual control of the torch is also included by the concepts of the present invention.

Figure 2A:
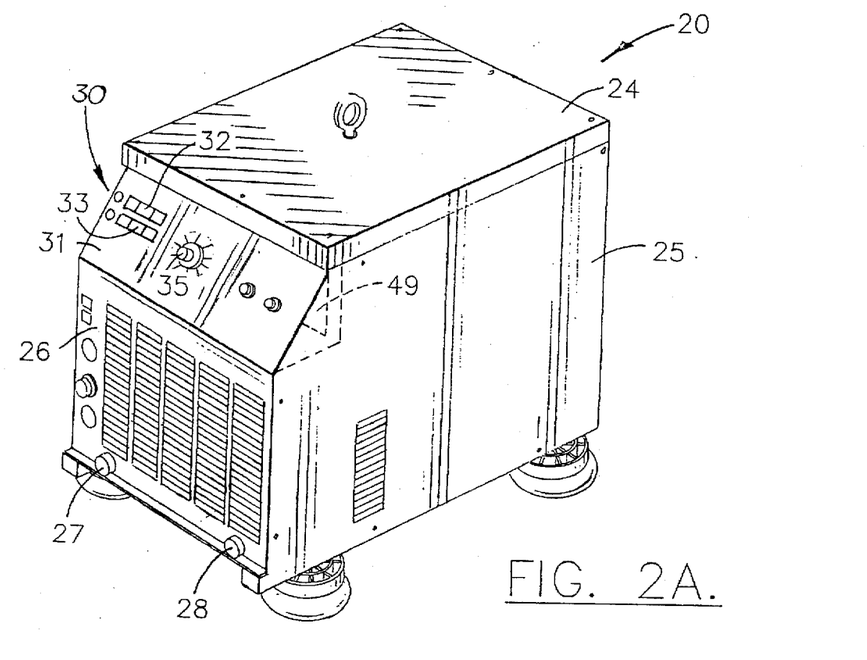
FIG. 2A illustrates a perspective view of a power source for a cutting or welding system according to an embodiment of the present invention.

As best illustrated in the perspective view of FIG. 2A, the power source 20 of the cutting or welding system 10 according to an embodiment of the present invention preferably includes several removable cover panels 24, 25, 26 which enclose the various components of the power source 20 to form a housing H. Either mounted to extend adjacent, formed integral with, or mounted through the front cover panel 26, the power source 20 also preferably includes a group of intake vents and various switches, controls, instruments, and terminals related to the power source 20. The power source 20 preferably includes at least one or more voltmeters and/or ammeters defining a meter 30, which preferably have a digital display 32, 33, to inform the operator about the condition of the cutting or welding power. The front cover 31 of the digital meter 30 may also include several resettable circuit breakers 37, 38, a voltage output control knob 35, and output terminals 27, 28. For example, large pushing or pulling forces may be applied to these terminals 27, 28 by the operator when connecting the electrode cables to the workpiece W and to the torch 11, and, accordingly, it is preferable that the terminals 27, 28 be rigidly mounted to the power source 20.

Figure 2B:
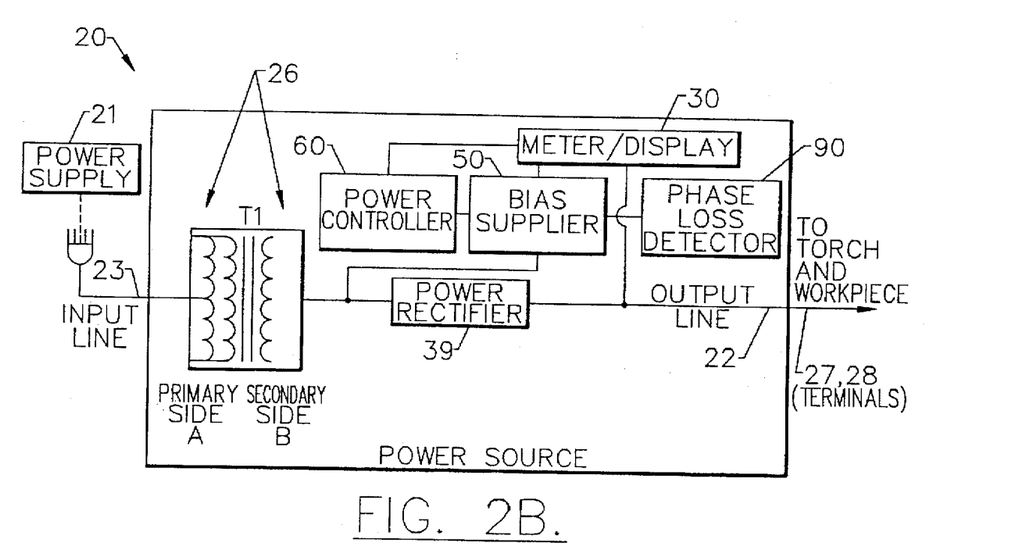
FIG. 2B illustrates a schematic view of a power source for a cutting or welding system according to an embodiment of the present invention.

The cutting or welding power source 20 according to the invention and as illustrated includes a power circuit 26 (see FIG. 2B) having various electrical components supported on a frame as illustrated in FIGS. 2A and 2B. In particular, the power circuit 26 preferably includes an electrical input line 23 which is operatively connected to an external power supply 25 such as conventional alternating household or industrial supply current. The input line 23 preferably is also operatively connected to a changeover terminal board (not shown) which allows for supply currents of various voltages and phase configurations to be used, which is especially useful, for example, when the welder power source 20 is used in countries having different current levels supplied from the power supply 25. Various connectors on the changeover terminal board are preconfigured depending on the supply current used to ensure the proper voltage and current levels at the output terminals 27, 28 of the power source 20.

The supply current from the external power supply 25 is passed from the changeover terminal board to a transformer T1. As understood by those skilled in the art, the electrical components of the power circuit 26 leading to the transformer T1 are considered to be on the primary side of the transformer T1, whereas the electrical components downstream of the transformer T1 are considered to be on the secondary side. The transformer T1 transforms the high voltage-low amperage supply current on the primary side to a low voltage-high amperage current on the secondary side, which is more desirable for cutting or welding operations.

The current from the secondary side of the transformer T1 is then passed to a rectifier or a rectifier circuit 39, where it is converted from alternating current (AC) to direct current (DC). As understood by those skilled in the art, the rectifier 39 preferably includes one or more thyristors in operative connection with one or more heat sinks. The thyristors, which are preferably silicon-controlled rectifiers (SCRs), generate large amounts of heat when rectifying the current and direct that heat to the heat sinks. The heat sinks (not shown) preferably include a piece of heat-conductive metal, such as aluminum, provided with a plurality of vanes which increase the surface area of the heat sink and improve convective heat transfer to the ambient air.

From the rectifier 39, the current is passed to one or more devices for smoothing out the voltage signal. In particular, the current preferably is passed through a filter or smoothing circuit 38 such as a bank of capacitors and/or an inductor which create a more uniform direct current. The current may also be passed through one or more resistors. The current is then passed to an output line 32, i.e., arc voltage output, which is connected to one of the output terminals 21 mounted adjacent to the front cover panel 26.

Figure 3:
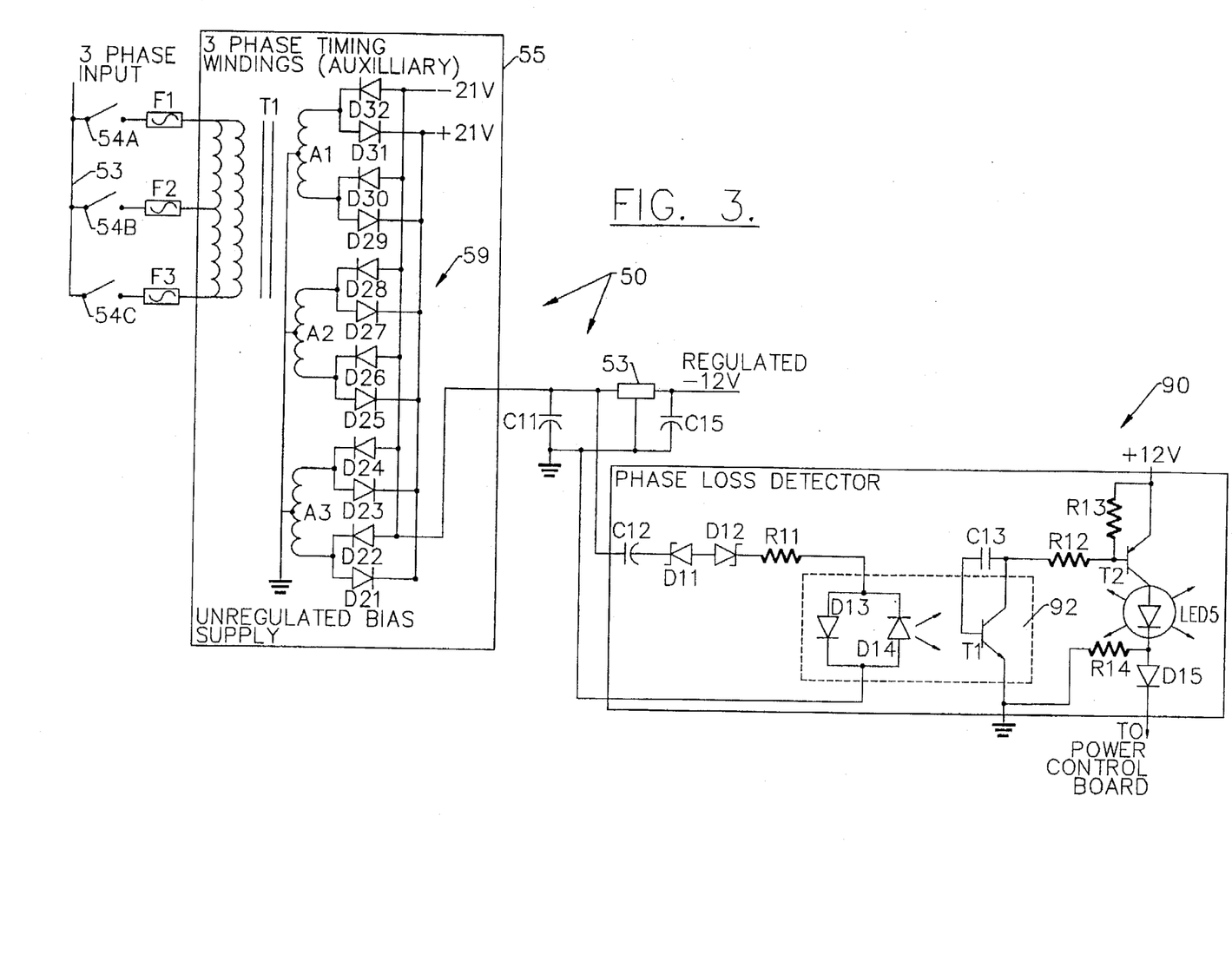
FIG. 3 illustrates a schematic view of a phase loss detector of a power source of a cutting or welding system according to an embodiment of the present invention.
Figure 4:
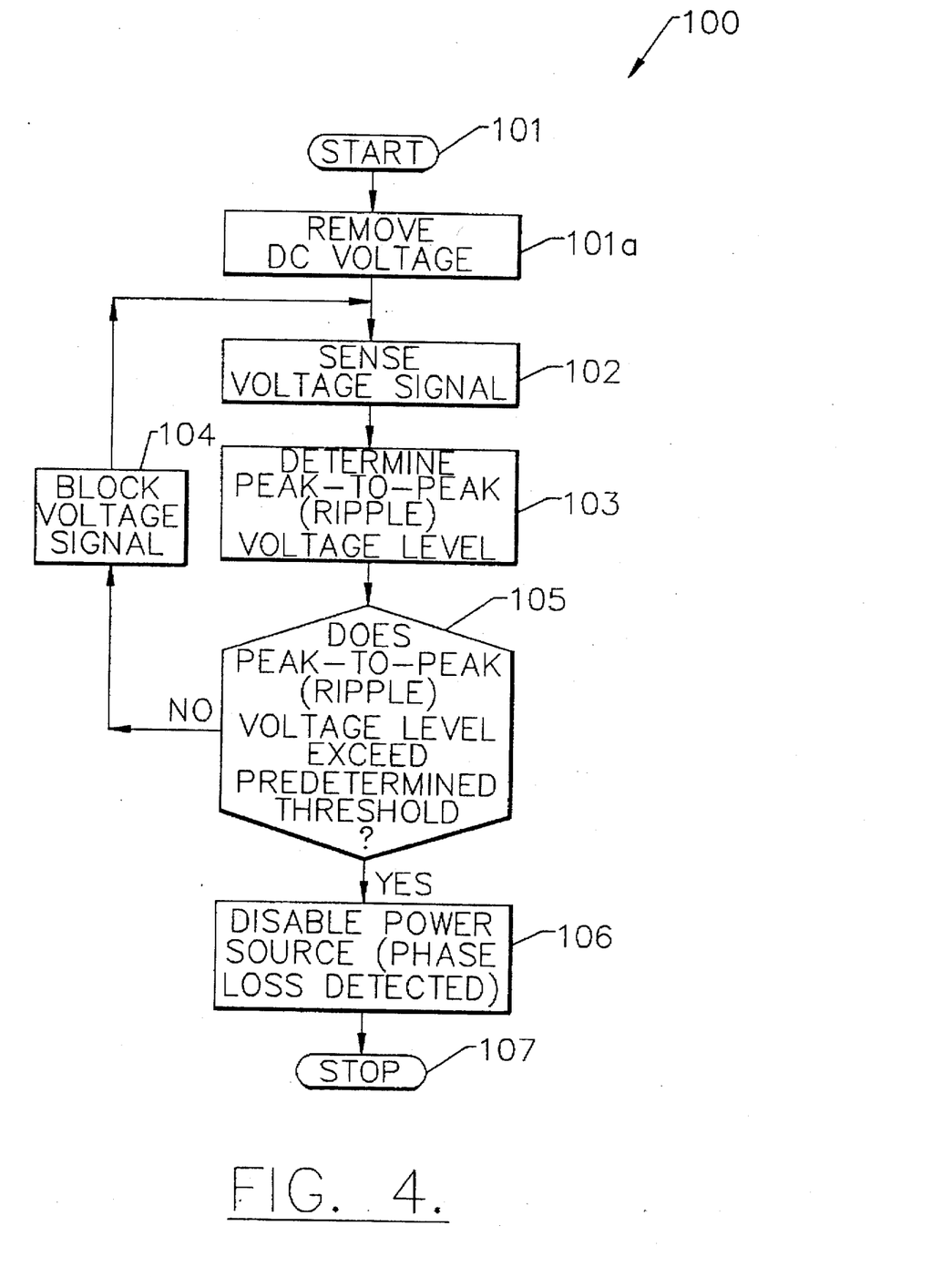
FIG. 4 illustrates a schematic block diagram and method of detecting phase loss for a power source of a cutting or welding system according to an embodiment of the present invention.

As best illustrated in FIGS. 3 and 4, the power source 20 of the present invention, further includes means, e.g., illustrated as a phase loss detector 90, operatively connected to the secondary side of the transformer T1 for detecting phase loss responsive to peak-to-peak ripple voltage exceeding a predetermined threshold. The phase loss detector 90 is preferably connected to the unregulated voltage of the output of a three-phase bridge rectifier circuit 59. The bridge rectifier circuit 59 includes a plurality of diodes D21, D22, D23, D24, D25, D26, D27, D28, D29, D30, D31, D32 as illustrated and which are positioned or operatively connected to the output of a three-phase auxiliary timing windings A1, A2, A3 on the secondary side of the transformer T1. A three-phase input 53 respectively connects to three switches 54A, 54B, 54C and three fuses F1, F2, F3 serially and correspondingly connected to the three switches 54A, 54B, 54C. The detector 90 is also preferably connected to the negative output of an unregulated bias supplier circuit 55 (e.g., bias supply) and passes through a filtering or bypass capacitor C12 (e.g., a DC exclusion circuit) so that the DC voltage level is excluded or removed and only the ripple voltage (i.e., alternating or AC) passes therethrough. It will also be understood by those skilled in the art that the positive output of the bias supplier 55 and/or the regulated voltage may be used as well. The phase loss detector is primarily interested in the ripple voltage from the output of the capacitor C12 so that line voltage fluctuations will not affect the voltage signal.

The phase loss detector 90 preferably includes a filter (e.g., C12) positioned to exclude an electrical signal representative of a voltage level so that only ripple voltage passes therethrough and a blocking circuit, e.g., such as a pair of back-to-back Zener diodes D11, D12, operatively connected to the filter for blocking the ripple voltage, e.g., about 3 volts when no phase loss is detected, responsive to the peak-to-peak ripple voltage level being below the predetermined threshold. The predetermined threshold is preferably about 4.5 volts. When this predetermined threshold is exceeded, a disabling circuit, e.g., optisolator 92 (diodes D13, D14, T1), a flip-flop circuit or switch, and associated drive circuitry (capacitor C13, resistors R12, R13, R14, diode D15, transistor T2), operatively connected to the blocking circuit is activated for disabling the power source 20. Preferably the disabling circuit shuts off the contactor or workpiece terminal 28 by shutting off thyristors or SCRs responsive to the peak-to-peak ripple voltage level being above the predetermined threshold, e.g., about 14–15 volts when a phase loss occurs or is detected. An indicator, such as the light emitting diode LED 5, is further operatively connected to the disabling circuit for indicating to an operator that at least one phase loss has been detected. This indicator LED5 may be positioned on the same internal circuit board on which most of the other components of the phase loss detector 90 are mounted for internal verification upon inspection of the power source 20. Preferably, however, the indicator LED5 is preferably positioned for external viewing by an operator so that when the power source 20 is disabled, the operator can readily recognize that it was due to the detection of the loss of one of the phases.

The present invention further preferably includes methods of detecting phase loss for a cutting or welding system 10 (see FIGS. 3–4). A method of detecting phase loss in a cutting or welding system 10 preferably includes filtering an electrical signal representative of a voltage level so that only a ripple voltage passes therethrough, detecting a change in the ripple voltage representative of a phase loss, and communicating the change in ripple voltage representative of a phase loss to an operator of the system 10.

Another method according to the invention preferably includes filtering an electrical signal representative of a voltage level so that only a ripple voltage passes therethrough, blocking the ripple voltage below a predetermined threshold, and disabling the power source 20 responsive to the ripple voltage exceeding a predetermined threshold. The method may also include indicating to an operator that loss of at least one phase has occurred.

In the drawings and specification, there have been disclosed typical preferred embodiments of the invention, and, although specific terms are employed, they are used in a generic and descriptive sense only and not for the purposes of limitation. The invention has been described in considerable detail with specific reference to various preferred embodiments. It will be apparent, however, that various modifications and changes can be made within the spirit and scope of the invention as described in the foregoing specification and defined in the appended claims.

That which is claimed is:

1. A cutting or welding system comprising:

a cutting or welding torch; and a power source operatively connected to said cutting or welding torch, said power source including a power circuit comprising an electrical input line positioned to receive power from an external power supply, a transformer having a primary side connected to said input line and a secondary side, a rectifier operatively connected to the secondary side of said transformer, and an output line connected to said rectifier, wherein said transformer further comprises auxiliary windings coupled to said primary side and means operatively connected to said auxiliary windings of said transformer for detecting phase loss responsive to a ripple voltage exceeding a predetermined threshold.

2. A cutting or welding system as defined in claim 1, wherein said phase loss detecting means includes a filter positioned to exclude an electrical signal representative of a predetermined voltage so that only ripple voltage passes, a blocking circuit operatively connected to said filter for blocking the ripple voltage responsive to the peak-to-peak ripple voltage being operatively below the predetermined threshold, and a disabling circuit operatively connected to the blocking circuit for disabling the power source responsive to the peak-to-peak ripple voltage being operatively above the predetermined threshold.

3. A cutting or welding system according to claim 2 wherein said filter and blocking circuit are arrangement in a serial relationship.

4. A cutting or welding system as defined by claim 2, wherein said blocking circuit includes at least a pair of diodes positioned back-to-back for blocking the peak-to-peak ripple voltage below the predetermined threshold.

5. A cutting or welding system as defined by claim 2, wherein said phase loss detecting means further comprises an indicator operatively connected to said disabling circuit for indicating to an operator that a phase loss has been detected.

6. A cutting or welding system comprising:

a cutting or welding torch; and a power source operatively connected to said cutting or welding torch, said power source including a power circuit comprising an electrical input line positioned to receive power from an external power supply, a transformer having a primary side connected to said input line and a secondary side, a rectifier operatively connected to the secondary side of said transformer, a bias supplier operatively coupled to the primary side of said transformer, and an output line operatively connected to said rectifier, and a phase loss detector operatively connected to said bias supplier for detecting phase loss responsive to a peak-to-peak ripple voltage exceeding a predetermined threshold.

7. A cutting or welding system as defined in claim 6, wherein said phase loss detector includes a filter operatively connected to said bias supplier and positioned to exclude an electrical signal representative of a predetermined voltage so that only ripple voltage passes therethrough, a blocking circuit operatively connected to said filter for blocking the ripple voltage responsive to the peak-to-peak ripple voltage being operatively below the predetermined threshold, and a disabling circuit operatively connected to the blocking circuit for disabling the power source responsive to the peak-to-peak ripple voltage being operatively above the predetermined threshold.

8. A cutting or welding system according to claim 7 wherein said filter and blocking circuit are arranged in a serial relationship.

9. A cutting or welding system as defined by claim 7, wherein said blocking circuit includes at least a pair of Zener diodes positioned back-to-back for blocking the peak-to-peak ripple voltage below the predetermined threshold.

10. A cutting or welding system as defined by claim 9, wherein said phase loss detector further comprises an indicator operatively connected to said disabling circuit for indicating to an operator that a phase loss has been detected.

11. A cutting or welding system as defined by claim 10, wherein said power source comprises a three-phase power source, and wherein said filter is operatively connected to an unregulated negative supply voltage of said bias supplier.

12. A power source for a cutting or welding system, the power source comprising:

a power circuit comprising an electrical input line positioned to receive power from an external power supply, a transformer having a primary side connected to said input line and a secondary side, a rectifier operatively connected to the secondary side of said transformer, a bias supplier operatively coupled to the primary side of said transformer, and an output line connected to said rectifier; and means operatively connected to the bias supplier for detecting phase loss responsive to a ripple voltage exceeding a predetermined threshold.

13. A power source as defined in claim 12, wherein said phase loss detector includes a filter operatively connected to said bias supplier and positioned to exclude an electrical signal representative of a predetermined voltage so that only ripple voltage passes therethrough, a blocking circuit operatively connected to said filter for blocking the ripple voltage responsive to the peak-to-peak ripple voltage being operatively below the predetermined threshold, and a disabling circuit operatively connected to the blocking circuit for disabling the power source responsive to the peak-to-peak ripple voltage being operatively above the predetermined threshold.

14. A power source according to claim 13 wherein said filter and blocking circuit are arranged in a serial relationship.

15. A power source as defined by claim 13, wherein said blocking circuit includes at least a pair of diodes positioned back-to-back for blocking the peak-to-peak ripple voltage below the predetermined threshold.

16. A power source as defined by claim 15, further comprising an indicator operatively connected to said disabling circuit for indicating to an operator that a phase loss has been detected.

17. A power source as defined by claim 16, wherein the power source comprises a three-phase power source, and wherein said filter is operatively connected to an unregulated negative supply voltage of said bias supplier.

18. A method of detecting phase loss in a power source of a cutting or welding system comprising:

filtering an electrical signal representative of a voltage so that only a ripple voltage passes therethrough;

blocking the ripple voltage below a predetermined threshold; and disabling the power source responsive to the ripple voltage exceeding a predetermined threshold.

19. A method as defined in claim 18, further comprising indicating to an operator a loss of at least one phase.

20. A method as defined in claim 18, wherein the filtering step includes the step of excluding an electrical signal representative of a direct-current voltage.

21. A power source for providing electrical power to a cutting or welding system including a cutting or welding torch, said power source comprising:

an electrical input line which receives electrical power from an external power supply;

a transformer having a primary side connected to said electrical input line and a secondary side;

a rectifier operatively connected to said secondary side of said transformer;

an output line operatively connected to said rectifier for providing the electrical power to the torch;

a bias supply circuit comprising auxiliary windings operatively coupled to said primary side of said transformer, and a rectifier circuit connected to said auxiliary windings so that said bias supply circuit generates a rectified electrical output signal different from the electrical power provided to the torch; and a phase loss detecting circuit operatively connected to said bias supply circuit which detects a ripple portion of said rectified electrical output signal and which determines a phase loss condition when said ripple portion exceeds a predetermined threshold.

22. A power source according to claim 21 wherein said phase loss detecting circuit comprises:

a filter which blocks a DC portion of said rectified electrical output signal and allows said ripple portion to pass;

a blocking circuit which blocks said ripple portion when said ripple portion is below said predetermined threshold and which passes said ripple portion when said ripple portion exceeds said predetermined threshold wherein said filter and blocking circuit are arranged in a serial relationship; and a detector which detects that said ripple portion exceeding said predetermined threshold has been passed by said blocking circuit to determine the phase loss condition.

23. A power source according to claim 21 further comprising:

a disabling circuit connected to said phase loss detecting circuit which disables said power source responsive to said ripple portion exceeding said predetermined threshold.

24. A cutting or welding system comprising:

a cutting or welding torch; and a power source operatively coupled to said torch, said power source comprising;

an electrical input line which receives electrical power from an external power supply, a transformer having a primary side connected to said electrical input line and a secondary side, a rectifier operatively connected to said secondary side of said transformer, an output line operatively connected to said rectifier for providing the electrical power to the torch, a bias supply circuit comprising auxiliary windings operatively coupled to said primary side of said transformer, and a rectifier circuit connected to said auxiliary windings so that said bias supply circuit generates a rectified electrical output signal different from the electrical power provided to the torch, and a phase loss detecting circuit operatively connected to said bias supply circuit which detects a ripple portion of said rectified electrical output signal and which determines a phase loss condition when said ripple portion exceeds a predetermined threshold.

25. A cutting or welding system according to claim 24 wherein said phase loss detecting circuit comprises:

a filter which blocks a DC portion of said rectified electrical output signal and allows said ripple portion to pass;

a blocking circuit which blocks said ripple portion when said ripple portion is below said predetermined threshold and which passes said ripple portion when said ripple portion exceeds said predetermined threshold wherein said filter and blocking circuit are arranged in a serial relationship; and a detector which detects that said ripple portion exceeding said predetermined threshold has been passed by said blocking circuit to determine the phase loss condition.

26. A cutting or welding system according to claim 24 further comprising:

a disabling circuit connected to said phase loss detecting circuit which disables said power source responsive to said ripple portion exceeding said predetermined threshold.

27. A power source for providing electrical power to a cutting or welding system including a cutting or welding torch, said power source comprising:

an electrical input line which receives electrical power from an external power supply;

a transformer having a primary side connected to said electrical input line and a secondary side;

a rectifier operatively connected to said secondary side of said transformer;

an output line operatively connected to said rectifier for providing the electrical power to the torch; and a phase loss detecting circuit coupled to said transformer, wherein said phase loss detecting circuit detects a ripple portion of said rectified electrical output signal and determines a phase loss condition when said ripple portion exceeds a predetermined threshold, and wherein said phase loss detecting circuit includes, a filter which blocks a DC portion of said rectified electrical output signal and allows said ripple portion to pass, a blocking circuit which blocks said ripple portion when said ripple portion is below said predetermined threshold and which passes said ripple portion when said ripple portion exceeds said predetermined threshold wherein said filter and blocking circuit are arranged in a serial relationship, and a detector which detects that said ripple portion exceeding said predetermined threshold has been passed by said blocking circuit to determine the phase loss condition.

28. A power source according to claim 27 further comprising:

a disabling circuit connected to said phase loss detecting circuit which disables said power source responsive to said ripple portion exceeding said predetermined threshold.

* * * * *

UNITED STATES PATENT AND TRADEMARK OFFICE
CERTIFICATE OF CORRECTION

PATENT NO. : 5,665,256
DATED : September 9, 1997
INVENTOR(S) : Tibor E. Toth

It is certified that error appears in the above-identified patent and that said Letters Patent is hereby corrected as shown below:

Column 6, line 15, "arrangement" should be -- arranged --.

Signed and Sealed this

Twenty-fifth Day of November, 1997

Attest:

BRUCE LEHMAN

Attesting Officer

Commissioner of Patents and Trademarks